United States Patent [19]

Kimpara

[11] 4,370,998
[45] Feb. 1, 1983

[54] FUEL TANK FOR RESERVING DIFFERENT KINDS OF FUELS

[75] Inventor: Akiyoshi Kimpara, Hamamatsu, Japan

[73] Assignees: Yamaha Hatsudoki Kabushiki Kaisha, Iwata; Sanshin Kogyo Kabushiki Kaisha, Hamamatsu, both of Japan

[21] Appl. No.: 221,051

[22] Filed: Dec. 29, 1980

[30] Foreign Application Priority Data

Jan. 10, 1980 [JP] Japan .................................. 55-2343

[51] Int. Cl.³ .......................... B65D 25/18; F17C 3/00
[52] U.S. Cl. ................................... 137/264; 137/558; 137/590; 220/20; 220/426; 220/469
[58] Field of Search ................ 220/20, 900, 426, 445, 220/465, 447, 466, 448, 468, 469; 244/135 R; 137/264, 587, 571, 575, 590, 558

[56] References Cited

U.S. PATENT DOCUMENTS

| | | | |
|---|---|---|---|
| 963,322 | 7/1910 | Purdy | 137/571 X |
| 1,248,403 | 11/1917 | Rockwell | 137/571n4 |
| 1,548,590 | 8/1925 | Farkas | 137/264 |
| 2,060,942 | 11/1936 | Kline et al. | 220/465 X |
| 2,404,418 | 7/1946 | Walker | 220/900 |
| 2,986,162 | 5/1961 | Spexarth | 137/264 X |
| 3,168,904 | 2/1965 | Conover | 137/264 X |
| 3,208,622 | 9/1965 | Trentham et al. | 220/445 X |
| 3,409,201 | 11/1968 | Carpenter, Jr. | 220/465 X |
| 4,164,304 | 8/1979 | Roberson | 220/465 |

FOREIGN PATENT DOCUMENTS

| | | | |
|---|---|---|---|
| 319918 | 4/1920 | Fed. Rep. of Germany | 244/135 R |
| 545684 | 2/1932 | Fed. Rep. of Germany | 220/445 |
| 57-1337 | 9/1975 | Japan . | |

Primary Examiner—Allan N. Shoap
Attorney, Agent, or Firm—Donald D. Mon

[57] ABSTRACT

A fuel tank having its inside divided into a plurality of compartments for respectively reserving different kinds of fuels comprising an outer casing equipped with a fuel inlet and forming one of said compartments, and at least one inner casing equipped with a fuel inlet, accommodated in said outer casing and forming the remainder of said compartments. The fuel inlet of said inner casing is fixed to said outer casing so that it sealingly passes through and protrudes from said outer casing.

4 Claims, 3 Drawing Figures

U.S. Patent     Feb. 1, 1983     4,370,998
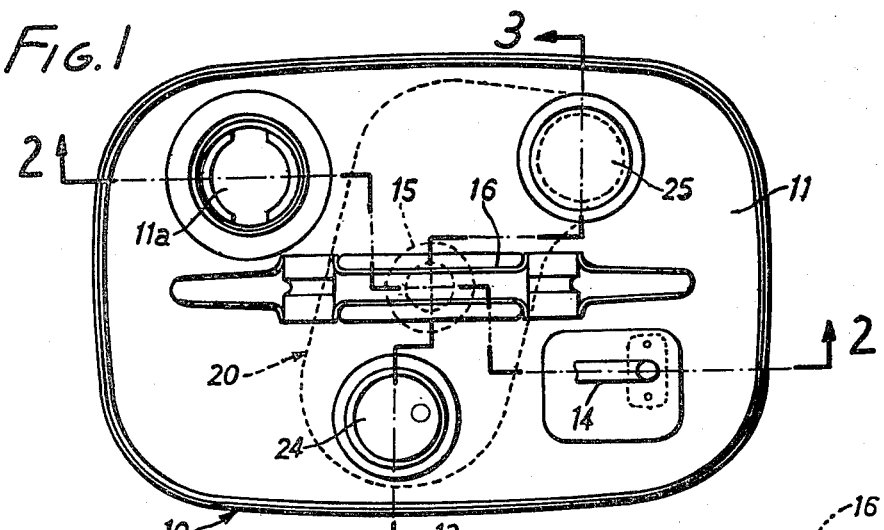
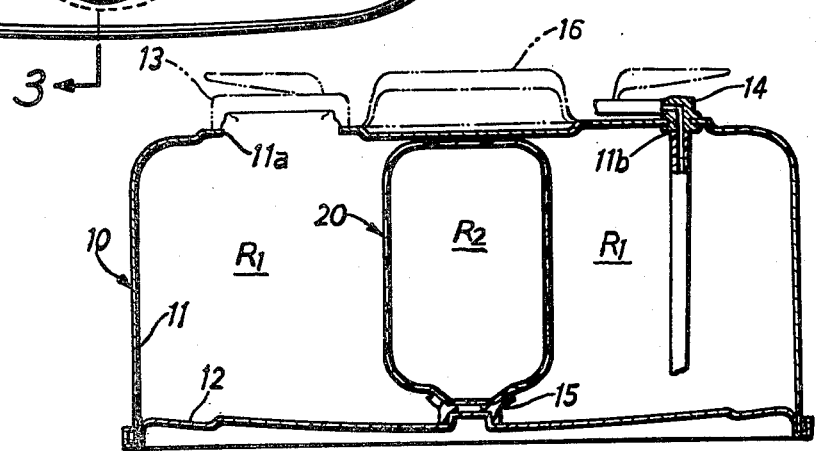
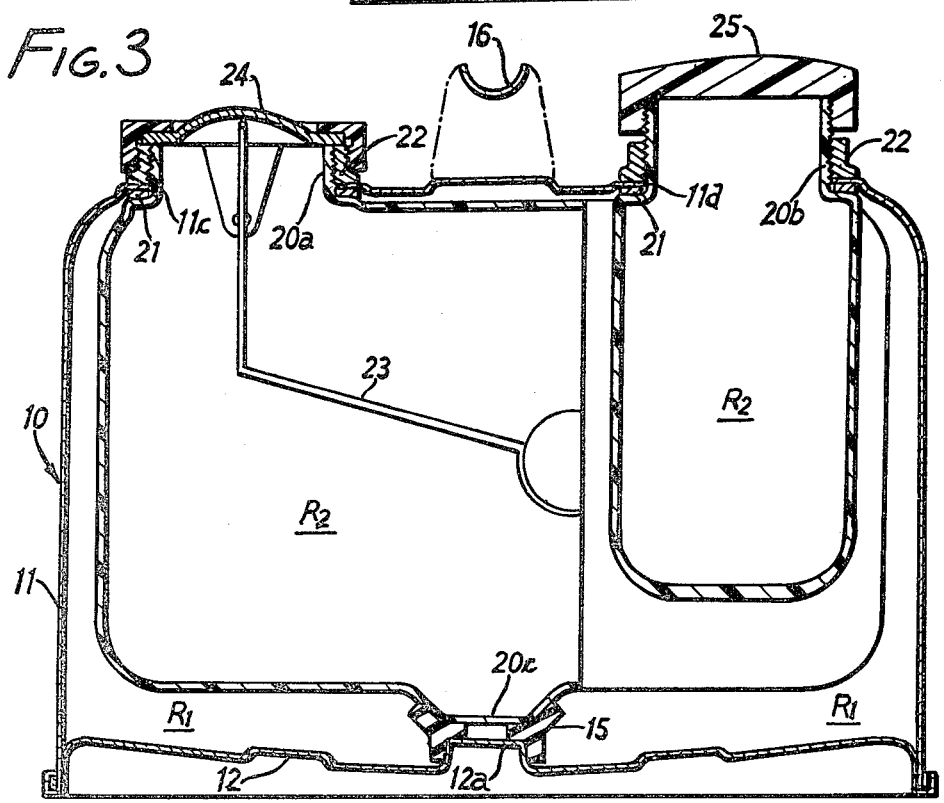

FUEL TANK FOR RESERVING DIFFERENT KINDS OF FUELS

FIELD OF THE INVENTION

The present invention relates to a fuel tank having its inside divided into a plurality of compartments for respectively reserving different kinds of fuels.

BACKGROUND OF THE INVENTION

A fuel tank of the above kind is often used as the fuel tank for an outboard engine. A main fuel such as kerosene or alcohol is interchangeably used together with an auxiliary fuel such as gasoline which has better ignitability and vaporizability than the main fuel. A fuel tank of this kind according to the prior art has its inside divided by means of a partition arranged in the tank body to form upper and lower compartments for respectively reserving the different kinds of fuels. However, since a fuel tank of this kind has its partition welded to the tank body, it has disadvantages in that the portions to be welded are complicated, that a rust preventing agent is melted by the welding heat thereby to reduce the corrosion resistance, and that a stress corrosion caused by the residual stress is liable to occur.

The present invention has been conceived in view of the background thus far described and comtemplates to provide a fuel tank which has its inside divided into a plurality of compartments without any use of welding, thereby to eliminate the corrosion resistance due to the welding process where welding otherwise would have been used.

BRIEF DESCRIPTION OF THE INVENTION

This invention includes an outer casing with a pair of openings. One opening is to receive fuel to be reserved in the outer casing itself. The other is to receive the neck of an inner casing contained inside the outer casing to reserve a different fuel. The neck passes through, projects beyond, and sealingly fits, in one of the openings of the outer casing.

The outer casing is preferably made with a body having an open bottom through which the inner casing can be placed inside it. Then a bottom is fitted to close this opening.

The above and other features of this invention will be fully understood from the following detailed description and the accompanying drawings, in which:

BRIEF DESCRIPTION OF THE DRAWINGS

FIG. 1 is a top plan view showing one embodiment of a fuel tank according to the present invention;

FIG. 2 is a longitudinal section taken along line II—II of FIG. 1; and

FIG. 3 is an enlarged longitudinal section taken along line III—III of FIG. 1.

DETAILED DESCRIPTION OF THE INVENTION

The presently preferred embodiment of a fuel tank according to the invention is shown in the drawings. This fuel tank is a portable fuel tank for an outboard engine, for reserving gasoline and kerosene. It is constructed of an outer casing 10 made of metal and an inner casing 20 made of synthetic resin.

The outer casing 10 is constructed of a body 11 having an open bottom, and a bottom cover 12 which hermetically closes the bottom opening of the outer casing body 11. The upper side of the outer casing body 11 is formed with a fuel inlet 11a to be hermetically closed by a tank cap 13, a mounting port 11b, to which a fuel outlet tube 14 is attached, and first and second mounting openings 11c and 11d, to which inner casing 20 is attached.

Bottom cover 12 is formed with a land 12a at its center portion. Bottom cover 12, thus formed, is hermetically attached to the bottom of the outer casing body 11 by having its outer peripheral edge fixed and caulked to the peripheral edge of the bottom of the outer casing body 11.

Inner casing 20 is formed into a container shape and has its upper side formed with two protruding mouths 20a and 20b, (sometimes called "necks"), which open upwardly, and its bottom at its center portion formed with a land 20c facing land 12a of bottom cover 12. Moreover, the respective protruding mouths 20a and 20b are formed into cylindrical shapes so they can be fitted into respective mounting openings 11c and lid in the outer casing body 11. Their outer circumferences are threaded.

Inner casing 20 is accomodated in outer casing 10 such that its land 20c is supported on a supporting member 15, which is made of rubber and is fitted on land 12a of bottom cover 12. Its protruding mouths (necks) 20a and 20b are fitted in respective mounting openings 11c and 11d of the outer casing body 11 through seal members 21 and 21 made of rubber, and is hermetically fixed to the outer casing 10 by fastening nuts 22 and 22 fastened onto protruding mouths 20a and 20b, respectively. Thus, the outer casing 10 has its inside divided into a kerosene reserving compartment $R_1$ and a gasoline reserving compartment $R_2$.

Incidentally, fuel gauge aperture 24 (which is made of transparent plastics) of a level gauge 23 and a fuel outlet tube (not shown) are attached to one protruding mouth 20a, and a tank cap 25 is attached to the other protruding mouth 20b. This latter protruding mouth 20b forms a fuel supply port. The upper side of the outer casing body 11 is equipped with a longitudinally extending hand grip 16.

A fuel tank having the construction thus far described is assembled in the following manner. Inner casing 20 is fixed in outer casing body 11 by first fitting seal members 21 and 21 on the outer circumferences of the respective protruding mouths (necks) 20a and 20b of the inner casing 20, by inserting the respective protruding mouths 20a and 20b into the mounting openings 11c and 11d of the outer casing body 11 from the inside of the body 11 until they project beyond body 11, and then applying the fastening nuts 22 and 22 on the threaded outer circumferences of respective protruding mouths 20a and 20b. Then, assembly of the tank is concluded by fitting supporting member 15 on land 12a of bottom cover 12, by placing bottom cover 12 in the bottom of the outer casing body 11 to close the bottom opening, and fixedly caulking the outer peripheral edge of the bottom of the outer casing body 11 in the outer peripheral edge of the bottom cover 12.

In the fuel tank thus constructed and assembled, land 20c of inner casing 20 is supported by supporting member 15 of bottom cover 12, and respective protruding mouths 20a and 20b of inner casing 20 are fixed to outer casing body 11 through seal members 21 and 21 by means of fastening nuts 22 and 22, thereby to partition the inside of outer casing 10 into kerosene reserving compartment R₁ and gasoline reserving compartment R₂. Thus, the fuel tank can be assembled without any use of welding means, and the inside of the outer casing 10 is divided into two compartments. As a result, it is possible to provide a fuel tank which is made better in its corrosion resistance than the described prior art, without risking deterioration in the corrosion resistance caused by welding.

The embodiment thus far described is no more than one example of the present invention. The present invention also can be practised in a modification, in which two or more inner casings are accommodated in the outer casing so that three or more kinds of different fuels may be reserved. Moreover, the shapes and constructions of the inner casing, and of the outer casing can be suitably modified.

As has been apparent from the foregoing description, according to the present invention, there can be provided a fuel tank having its inside divided into a plurality of compartments for respectively reserving different kinds of fuels, said fuel tank comprising an outer casing equipped with a fuel inlet and forming one of the compartments, and at least one inner casing equipped with a fuel inlet. The inner casing is accommodated in the outer casing and forms the other one of the compartments. The fuel inlet of the inner casing is fixed to the outer casing so that it hermetically protrudes from the outer casing through a seal member. As a result, it is possible to provide the fuel tank of that kind without the use of welding means, while preserving corrosion resistance from degradation that would be caused by the use of welding.

This invention is not to be limited to the embodiment shown in the drawings and described in the description, which is given by way of example and not of limitation, but only in accordance with the scope of the appended claims.

I claim:

1. A fuel tank for containing and separately reserving a plurality of fuels comprising:

an outer casing comprising a body having a top wall with a first opening, a second opening, and a third opening therethrough, a side wall and a bottom opening, said top wall and side wall forming a first fuel-receiving cavity, and a bottom member sealingly attached to the perimeter of said bottom opening so as to close said cavity;

an inner casing having a continuous wall to form a second fuel-receiving cavity, and two necks, each forming an opening passing through a respective one of said openings;

said inner casing having been placed in said cavity of said outer casing prior to attachment of said bottom member to said outer casing, a space being provided between the inner and outer casings to define said first fluid-receiving cavity, said first opening communicating with said first cavity;

seal and fastener means fixing and hermetically sealing said necks to said openings;

closure means for each of said openings, the closure for said first opening, and for at least one of said second and third openings being removable to give access to a respective cavity;

there being a spacing between said bottom member and the bottom of said inner casing, and an elastomeric support member resting on said bottom member and supporting and centering said inner casing.

2. A fuel tank according to claim 1 in which the means for attachment of the bottom member to said body is weldless.

3. A fuel tank according to claim 1 in which said bottom means is sealingly attached to said perimeter by a peripheral rubber-like seal.

4. A fuel tank according to claim 1 in which a fuel outlet tube is provided.

* * * * *